US008370271B1

(12) United States Patent
Robinson et al.

(10) Patent No.: US 8,370,271 B1
(45) Date of Patent: Feb. 5, 2013

(54) RECURRING DELIVERY OF PRODUCTS

(75) Inventors: Heidi S. Robinson, Seattle, WA (US);
Denise J. Noyes, Seattle, WA (US);
Kenneth S. Kuan, Mercer Island, WA (US); Magdalena Malinowska, Bellevue, WA (US); Linde E. Husk, Bow, WA (US)

(73) Assignee: Amazon Technologies, Inc., Reno, NV (US)

( * ) Notice: Subject to any disclaimer, the term of this patent is extended or adjusted under 35 U.S.C. 154(b) by 394 days.

(21) Appl. No.: 12/610,802

(22) Filed: Nov. 2, 2009

(51) Int. Cl.
*G06Q 30/00* (2012.01)
(52) U.S. Cl. .................. 705/330; 705/26.7; 705/27.1
(58) Field of Classification Search ............ 705/26.7, 705/27.1, 330
See application file for complete search history.

(56) References Cited

U.S. PATENT DOCUMENTS

| | | | |
|---|---|---|---|
| 7,716,089 B1 * | 5/2010 | Gavarini ............... | 705/26.8 |
| 8,015,068 B2 * | 9/2011 | Swamy et al. ............ | 705/26.1 |
| 2002/0077929 A1 * | 6/2002 | Knorr et al. ............. | 705/26 |
| 2005/0278313 A1 * | 12/2005 | Plow et al. .............. | 707/3 |
| 2006/0038010 A1 * | 2/2006 | Lucas ................... | 235/385 |
| 2006/0235764 A1 * | 10/2006 | Bamborough et al. ..... | 705/26 |
| 2008/0015951 A1 | 1/2008 | Kerker et al. | |
| 2010/0235210 A1 * | 9/2010 | Nadrotowicz, Jr. ........ | 705/8 |
| 2011/0082771 A1 * | 4/2011 | Pritikin et al. ........... | 705/27.1 |
| 2011/0258072 A1 * | 10/2011 | Kerker et al. ............ | 705/26.7 |

OTHER PUBLICATIONS

U.S. Appl. No. 11/856,416, filed Sep. 17, 2007,"Method and System for Recurring Order Subscription with Discounts," Inventors Manolis et al.

Ocado, www.ocado.com, accessed Sep. 30, 2009, 4 pages.
Spud, www.spud.com, accessed Sep. 30, 2009, 1 page.
"100 Woman. 100,000 Dollars. 1 Million Diapers. National Diaper Warehouse (NDW) Rallies Young Entrepreneurs with a Social Conscience." Press release dated Jun. 3, 2004. [online][retrieved on Jun. 19, 2012] retrieved from: http://www.pressreleasenetwork.com/newsroom/news_view.phtml?news_id=882 3 pps.
"Amazon Will Take Hit on Harry Potter; Shareholders Told Company Won't Make Profit Despite Brisk Sales of New Book", *The Times—Transcript*, Moncton, N.B.: Jun. 15, 2007, 2 pps.
U.S. Official Action dated Jun. 3, 2010 in U.S. Appl. No. 11/856,416.
U.S. Official Action dated Oct. 12, 2010 in U.S. Appl. No. 11/856,416.

* cited by examiner

*Primary Examiner* — Fadey Jabr
(74) *Attorney, Agent, or Firm* — Hope Baldauff Hartman, LLC

(57) ABSTRACT

Technologies are described herein for providing recurring delivery of products to a customer on a periodic basis. A customer creates a recurring delivery list that specifies a particular delivery slot indicating when orders are to be delivered. The customer adds products to the recurring delivery list, specifying a quantity and frequency of delivery for each product. Orders are periodically generated from the customer's recurring delivery list for delivery on the next occurrence of the specified delivery slot. The products included in each order are based on the frequency of delivery and a last delivery date for each product in the recurring delivery list. If the customer makes changes to the recurring delivery list, those changes may also be applied to any pending orders generated from the list.

21 Claims, 12 Drawing Sheets

RECURRING DELIVERY OF PRODUCTS

BACKGROUND

Many types of products may be purchased online for delivery directly to a customer, including grocery items and other consumables. Delivery of consumable products may present special challenges to online merchants of such products. For instance, these types of products may be perishable or have a limited shelf life, requiring different inventory control, delivery, and other logistic processes for these types of products. Challenges may also be presented to a customer that orders consumable products from an online merchant. For instance, the customer may need to repeatedly place orders for the same consumable products on a regular basis, and the customer may have to track the shipment of the products to arrange to be present at delivery in order to ensure that perishable goods do not spoil.

Some online merchant systems may provide customers the ability to place standing orders for delivery of consumable products on a recurring basis, such as every week or every month. However, these systems may be limited in their flexibility for allowing modifications of the recurring orders or for allowing the addition of one-time or specialty products to an order. Further, the customer may not be able to schedule the recurring orders for the same time and day of each week or month, thereby making it difficult for the customer to arrange to be present at the delivery of perishable goods or other consumables.

It is with respect to these and other considerations that the disclosure made herein is presented.

BRIEF DESCRIPTION OF THE DRAWINGS

FIGS. 8-11 are display diagrams showing an illustrative user interface for maintaining the recurring delivery list and any pending orders generated from the recurring delivery list, according to embodiments presented herein;

DETAILED DESCRIPTION

Figure 1:
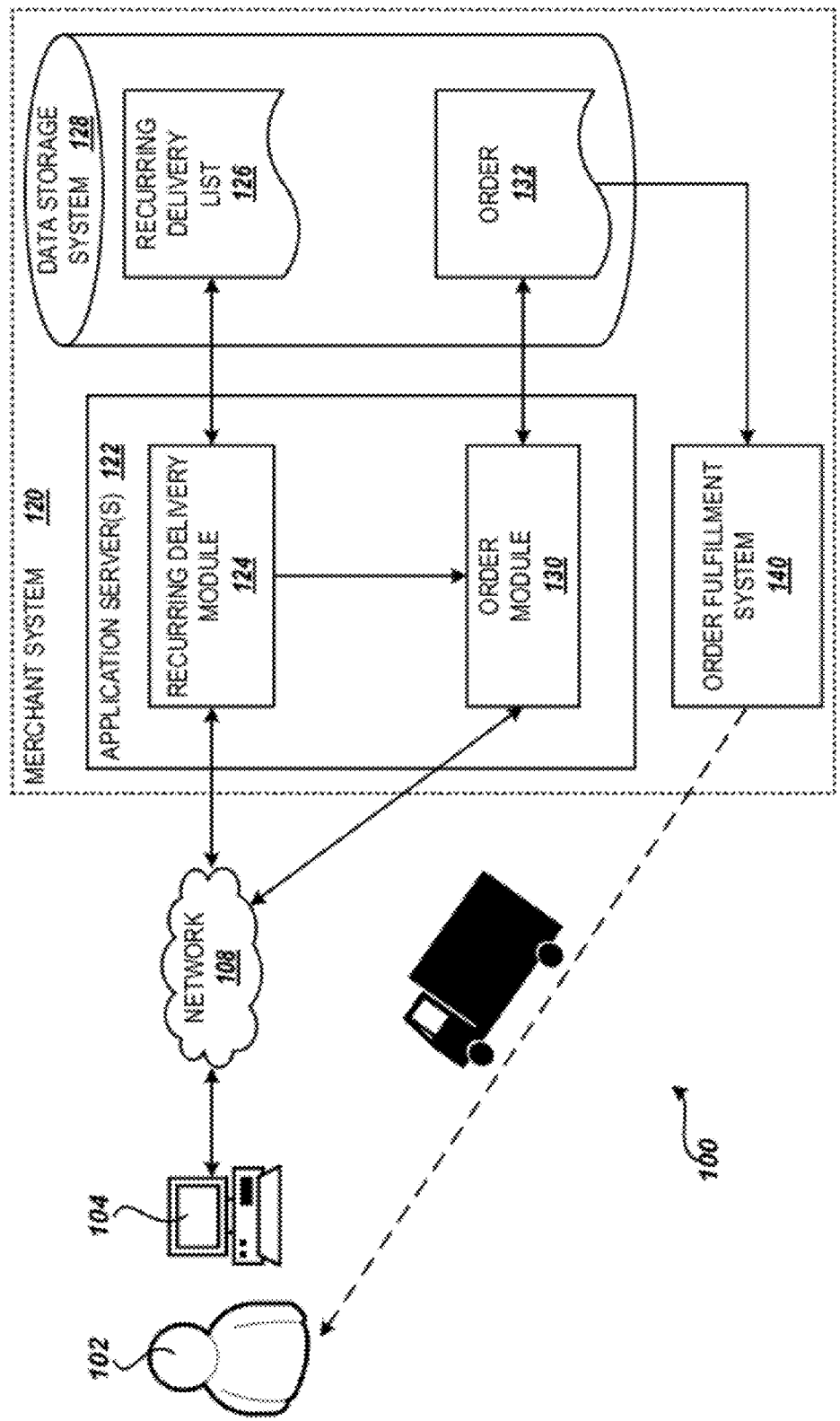
FIG. 1 is a system and network diagram showing aspects of an illustrative operating environment for the recurring delivery of products, including several software and hardware components provided by embodiments presented herein.

The following detailed description is directed to technologies for providing recurring delivery of products to a customer on a periodic basis, without requiring the customer repeatedly place orders for the products. According to embodiments, a customer may create a recurring deliver list that specifies a list of products for recurring delivery in a merchant system. The recurring delivery list identifies each product to be delivered on a recurring basis, as well as a quantity and frequency of delivery for each. For instance, a customer may request delivery of one bunch of bananas every week and two gallons of milk every two weeks.

The customer may also specify a particular delivery slot when the recurring orders are to be delivered. The delivery slot specifies the day and time for the delivery of the recurring orders. For example, the customer may specify a particular time period on a particular day of the week, such as 7:00-8:00 AM on Tuesdays or 1:00-2:00 PM on Thursdays. In one embodiment, the customer may be able to specify a delivery slot that is designated as "unattended." An unattended delivery is one in which the customer need not be present during the delivery of the products, such as pre-dawn on Mondays.

The merchant system may periodically generate an order from the customer's recurring delivery list for delivery on the next occurrence of the specified delivery slot. For example, the merchant system may check the frequency of delivery of each product identified in the recurring delivery list along with a last delivery date for that product to determine if the product should be included in a generated order. If so, then the quantity of the product specified in the recurring delivery list is added to the order.

In one embodiment, the order may be generated in advance of the scheduled delivery of the order so that the order remains pending for a period of time before delivery. For example, the merchant system may generate orders for weekly delivery seven days in advance. Moreover, any changes made to the recurring delivery list may be applied to any pending orders generated from the list. These changes may include changes to the quantity or frequency of delivery of products identified in the list, or the suspension of delivery of a particular product for a specified period of time or indefinitely.

Because the customer may specify a particular delivery slot for the delivery of the orders generated from the recurring delivery list, including unattended delivery slots, the customer is able to precisely manage the delivery schedule, thus avoiding many of the challenges presented by the delivery of perishable goods or other consumables. In addition, because the orders generated from the recurring delivery list remain pending for a period of time in advance of delivery, the customer has the flexibility to add specialty products or one-time products to the currently pending order, while any changes made by the customer to the recurring delivery list during the period of pendency will be reflected in the pending order as well.

It should be appreciated that the subject matter presented herein may be implemented as computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 including several software components for providing recurring delivery of products to a customer on a periodic basis, according to embodiments provided herein. The environment 100 includes a customer 102 that uses a customer computer 104 to access a merchant system 120 across a network 108. The customer 102 may be an individual or entity that desires to have a number of products delivered to the customer's premises or other specific location on a recurring basis. The customer computer 104 may be a personal computer ("PC"), a desktop workstation, a laptop, a notebook, a personal digital assistant ("PDA"), a game console, a set-top box, a consumer electronics device, a server computer, or any other computing device capable of connecting to the network 108 and communicating with the merchant system 120.

The network 108 may be a local-area network ("LAN"), a wide-area network ("WAN"), the Internet, or any other networking topology known in the art that connects the customer computer 104 to the merchant system 120. The merchant system 120 may include a number of application servers 122 that provide various application services to the customer computer 104 over the network 108. The customer 102 may use a client application program executing on the customer computer 104, such as a web browser, to access and utilize the services provided by the application servers 122 across the network 108. Alternatively, the customer computer 104 may utilize any number of communication methods known in the art to communicate with the merchant system 120 and/or the application servers 122 across the network 108, including proprietary client-server architectures, e-mail, short message service ("SMS") messaging, or other messaging technologies, and the like.

The application servers 122 may execute a number of modules in order to provide the services to the customer computer 104. The modules may execute on a single application server 122 or in parallel across multiple application servers in the merchant system 120. In addition, each module may consist of a number of subcomponents executing on different application servers 122 or other computing devices in the merchant system 120. The modules may be implemented as software, hardware, or any combination of the two.

According to one embodiment, a recurring delivery module 124 executes on the application servers 122. The recurring delivery module 124 provides services to the customer computer 104 that allow the customer 102 to select products for recurring delivery, specify a quantity and frequency of delivery for each product, specify a delivery address, specify a delivery slot for the delivery of the products, and specify a payment method for the delivery. The customer 102 may make these selections through a user interface ("UI") presented by the recurring delivery module 124 to the customer at the customer computer 104, as will be described below in regard to FIGS. 4-7. The recurring delivery module 124 may present the UI to the customer 102 by sending a series of web pages to be rendered by a browser application executing on the customer computer 104, for example. Alternatively, the recurring delivery module 124 may receive the selections from the customer computer 104 by means of a messaging technology, such as SMS messaging or e-mail, or through a number of application programming interfaces ("APIs") exposed by the recurring delivery module. It will be appreciated that any number of methods and technologies may be utilized that allow the recurring delivery module 124 to receive these selections and other input data from the customer 102, and it is intended that all such methods and technologies be included within the scope of this application.

The recurring delivery module 124 may store the customer's selections of products for recurring delivery in a recurring delivery list 126. The recurring delivery list 126 may be a data structure that stores the identity of the selected products as well as the parameters for the products' recurring delivery, as will be described in more detail below in regard to FIG. 2. The recurring delivery list 126 may be stored in a data storage system 128, such as a database server, that is accessible by the application servers 122 and other components of the merchant system 120. In a further embodiment, the recurring delivery module 124 provides services to the customer computer 104 that allow the customer 102 to manage the product selections and other parameters in the recurring delivery list 126, such as changing the quantity and/or frequency of delivery of a product or suspending the delivery of a product for a specified period or indefinitely. The customer 102 may manage the recurring delivery list 126 through a UI presented by the recurring delivery module 124 to the customer at the customer computer 104, as will be described below in regard to FIGS. 8-11, or through some other method or technology implemented by the recurring delivery module.

As will be described in more detail below, the recurring delivery module 124 periodically generates an order 132 for the delivery of one or more products identified in the recurring delivery list 126, according to the parameters contained therein. In one embodiment, the recurring delivery module 124 utilizes an order module 130 executing on the application servers 122 to generate the orders. The order module 130 may be part of an existing order processing system within the merchant system 120, or the order module may be provided by an order processing system separate from the merchant system. The order module 130 in turn may create an order 132 in the data storage system 128 for the delivery of the products desired by the customer 102. The order 132 identifies the products to be delivered to the customer as well as the parameters for delivery of the products, as will be described in more detail below in regard to FIG. 3. The order module 130 may further provide services to the recurring delivery module 124 or directly to the customer computer 104 via the network 108 that allow the order 132 to be modified or canceled once it has been generated.

Once the order 132 is generated, it is made available to an order fulfillment system 140 for processing and delivery to the customer 102. The order fulfillment system 140 may consist of a variety of components, including, but not limited to, an order processing component, a billing component, an inventory control component, an order picking component, a delivery scheduling component, and other logistics and control systems. All of the components that make up the order fulfillment system 140 may be included in the merchant system 120, or some or all of the components may be provided by external providers.

Figure 3:
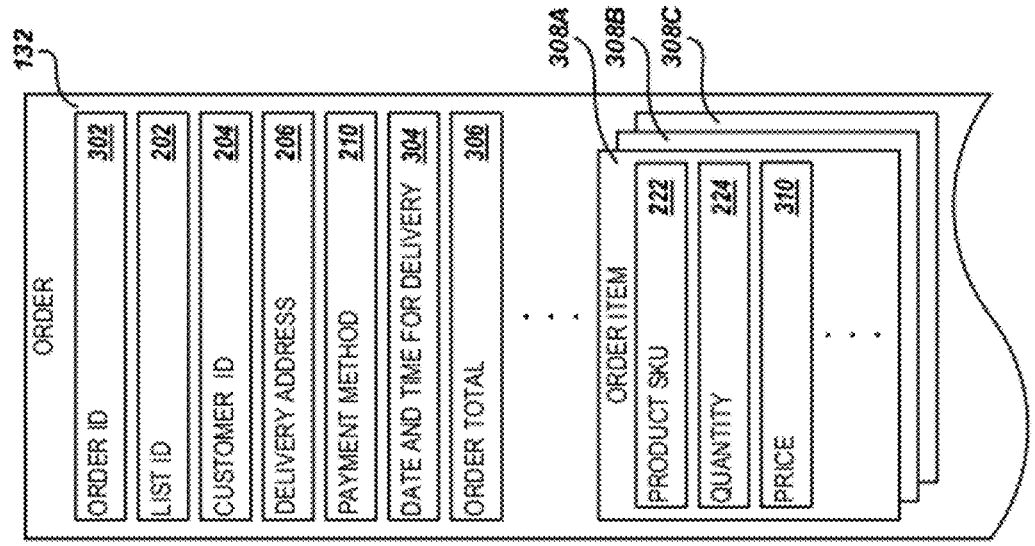
FIG. 3 is a data structure diagram illustrating a number of data elements stored in an order generated from the recurring delivery list, according to embodiments presented herein.
Figure 2:
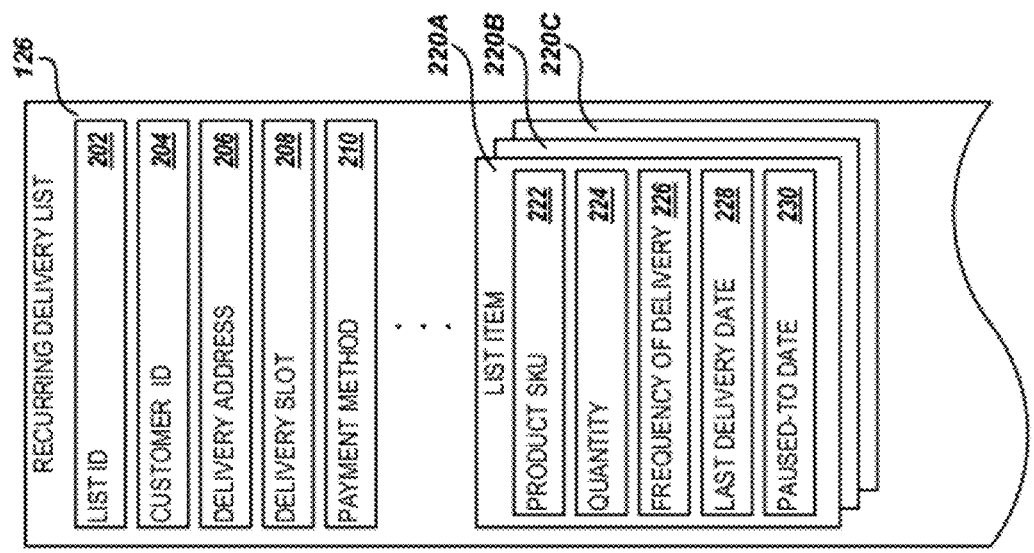
FIG. 2 is a data structure diagram illustrating a number of data elements stored in a recurring delivery list, according to embodiments presented herein.

FIGS. 2 and 3 are data structure diagrams showing a number of data elements stored in a data structure. It will be appreciated by one skilled in the art that each of the data structures shown in the figures may represent a database table, an object stored in a computer memory, a programmatic structure, or any other data container commonly known in the art. Each data element included in the data structures may represent one or more fields or columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

FIG. 2 shows one example of data elements that may be stored in the recurring delivery list 126, according to embodiments. As described above, the recurring delivery list 126 stores the identity of the products selected by the customer 102 for recurring delivery, as well as other parameters regarding the delivery of the products. The recurring delivery list 126 may contain a list identifier ("ID") 202 that identifies the recurring delivery list to the recurring delivery module 124 and other system modules. The recurring delivery list 126 may also contain a customer ID 204 that identifies the customer 102 and allows the recurring delivery list to be related to profile data for the customer maintained in the merchant system 120. According to one embodiment, each customer 102 may only have one recurring delivery list 126. In other embodiments, multiple recurring delivery lists 126 may exist for the same customer 102.

The recurring delivery list 126 may contain a delivery address 206 for the delivery of the selected products. In one embodiment, the delivery address 206 is an identifier of a shipping address maintained in the profile data for the customer 102. In other embodiments, the delivery address may contain a specific street address of a location where delivery is to take place.

The recurring delivery list 126 also contains a delivery slot 208 identifying when the delivery of orders generated from the recurring delivery list should occur. The delivery slot 208 may be an identifier of one of a number of predetermined periods of time within a recurring delivery cycle that may be scheduled for delivery. For example, if the recurring delivery module 124 generates an order from the recurring delivery list 126 on a weekly basis, i.e. a weekly delivery cycle, the predetermined periods may consist of a range of times, such as 7:00-8:00 AM, on a particular day of the week, such as Tuesday. For a monthly delivery cycle, then the predetermined periods may similarly be a range of times, such as 7:00-8:00 AM, on a particular day of the month, such as the $23^{rd}$ day. It will be appreciated that for recurring delivery cycles other than weekly or monthly, the predetermined periods may differ from those described herein. In a further embodiment, the predetermined periods may be target times for delivery, such as 7:15 AM, instead of the range of times described above. In all cases, the predetermined periods of time within the recurring delivery cycle may be selected to allow the merchant flexibility in scheduling delivery of orders, while ensuring that the customer 102 may easily arrange to be present at the specified delivery time.

In one embodiment, the delivery slot 208 may specify a predetermined period of time designated as an "unattended" delivery slot. An unattended delivery slot is a period of time for delivery where the customer 102 need not be present when the delivery occurs. For example, the customer 102 may be able to schedule unattended delivery of the orders generated from the recurring delivery list 126 for pre-dawn on Tuesdays, or from 3:00-6:00 PM on Thursdays. Unattended delivery slots may be broader periods of time than the "attended" delivery slots described above, providing the merchant greater flexibility in scheduling delivery of orders to the customer. The unattended delivery slots may also provide additional flexibility to the customer 102 by not requiring that the customer be present during delivery, but ensuring that the customer's products will be delivered by a particular day and time.

It will be appreciated that certain products may not be eligible for unattended delivery, such as items requiring a verification of age by delivery personnel before relinquishing the products to the customer 102. In one embodiment, the recurring delivery module 124 may alert the customer 102 when ineligible products are added to a recurring delivery list 126 specifying an unattended delivery slot. In other embodiments, the recurring delivery module 124 or the order fulfillment system 140 may implement other contingency procedures for the ineligible products.

The recurring delivery list 126 may further contain a payment method 210 for orders generated from the recurring delivery list. In one embodiment, the payment method 210 is an identifier of a particular method of payment maintained in the profile data for the customer 102. In other embodiments, the payment method 210 may contain credit card information, checking account information, or other information describing a method of payment for the generated orders.

According to embodiments, the recurring delivery list 126 further contains one or more list items 220A-220C (also referred to herein as list item 220) identifying the products added to the recurring delivery list. Each list item 220 may contain a product stock-keeping unit ("SKU") 222 that uniquely identifies the product selected by the customer 102. The list item 220 also contains a quantity 224 indicating the number of the product to be delivered in each generated order that includes the selected product.

In addition, the list item 220 contains a frequency of delivery 226 and a last delivery date 228 for the selected product. The frequency of delivery 226 may be a multiple of the recurring delivery cycle described above. For example, for a weekly delivery cycle, the frequency of delivery 226 may specify a number of weeks that should occur between successive deliveries of the selected product. The last delivery date 228 may specify the date that the selected product was last scheduled for delivery in an order generated from the recurring delivery list 126. In one embodiment, the recurring delivery module 124 utilizes the frequency of delivery 226 and the last delivery date 228 of each list item 220 to identify the products that are to be included in the orders generated from the recurring delivery list 126, as will be described in more detail below in regard to FIG. 12.

In a further embodiment, the list item 220 also contains a paused-to date 230. As described above in regard to FIG. 1, the recurring delivery module 124 may allow the customer 102 to suspend the delivery of a product for a specified period of time or indefinitely. The recurring delivery module 124 may utilize the paused-to date 230 to indicate that delivery of the selected product is currently suspended, or "paused," until the date specified by the paused-to date 230. It will be appreciated that the paused-to date 230 may contain a specific, pre-defined date value to indicate that delivery of the selected product is suspended indefinitely. It will be further appreciated that the recurring delivery list 126 may contain additional data elements beyond those shown in FIG. 2 and described above that may be utilized by the recurring delivery module 124 to provide recurring delivery of products to the customer 102.

FIG. 3 shows one example of data elements that may be stored in an order 132 generated from the recurring delivery list 126, according to embodiments. As described above, the order 132 identifies the products to be delivered to the customer as well as parameters for delivery of the products. The order 132 may contain an order ID 302 that identifies the order to the recurring delivery module 124, the order module 130, the order fulfillment system 140, and/or other system modules in the merchant system 120. The order 132 also contains the list ID 202 and customer ID 204 from the recurring delivery list 126. The list ID 202 identifies the recurring delivery list 126 from which the order was generated, while the customer ID 204 allows the order 132 to be related to the customer 102 in the merchant system 120. The order 132 may further contain the delivery address 206 and payment method 210 specified in the recurring delivery list 126. These data elements are utilized by the order fulfillment system 140 in processing and delivering the order, according to embodiments.

The order 132 may also contain a date and time for delivery 304 for the order. According to one embodiment, the date and time for delivery 304 represents the next occurrence of the delivery slot 208 specified in the recurring delivery list 126 on which products are scheduled for delivery. For example, if the recurring delivery list 126 specifies a delivery slot 208 of 7:00-8:00 AM on Tuesdays and contains a list item 220 with a frequency of delivery 226 of once a week, then an order 132 generated from the recurring delivery list on Jul. 29, 2009 may have a date and time for delivery 304 of Aug. 4, 2009 at 6:15 AM. In one embodiment, the time component of date and time for delivery 304 is calculated when the order 132 is generated based on a delivery schedule maintained in the order fulfillment system 140. In another embodiment, the time component of the date and time for delivery 304 indicates the time range from the delivery slot 208 specified in the recurring delivery list 126. The actual time for delivery may be determined after generation of the order 132 by the order fulfillment system 140 or may be left to the discretion of delivery personnel.

The order 132 further contains one or more order items 308A-308C (also referred to herein as order item 308) identifying the products to be delivered with the order. According to embodiments, the recurring delivery module 124 creates the initial order items 308 from the recurring delivery list 126 based on the frequency of delivery 226 and the last delivery date 228 of each list item 220 in the recurring delivery list, as will be described in more detail below in regard to FIG. 12.

Each order item 308 contains the product SKU 222 and quantity 224 from the corresponding list item 220. It will be appreciated that, after the initial generation of the order 132 by the recurring delivery module 124, additional order items 308 may be added or order items may be removed from the order 132 by the customer 102 through the order module 130, as described above in regard to FIG. 1. Moreover, the quantity 224 of each order item 308 may be changed by the customer 102 after initial generation of the order 132, as will be described below in regard to FIG. 8.

It will be appreciated that the order 132 may contain additional data elements beyond those shown in FIG. 3 and described above that are utilized by the order module 130 and the order fulfillment system 140 in the processing and delivery of the order to the customer 102. For example, each order item 308 may further contain a price 310 for the associated product. The order 132 may also contain an order total 306 that represents the total calculated cost of the order, including the price of the order items along with any fees, taxes, etc.

Figure 4:
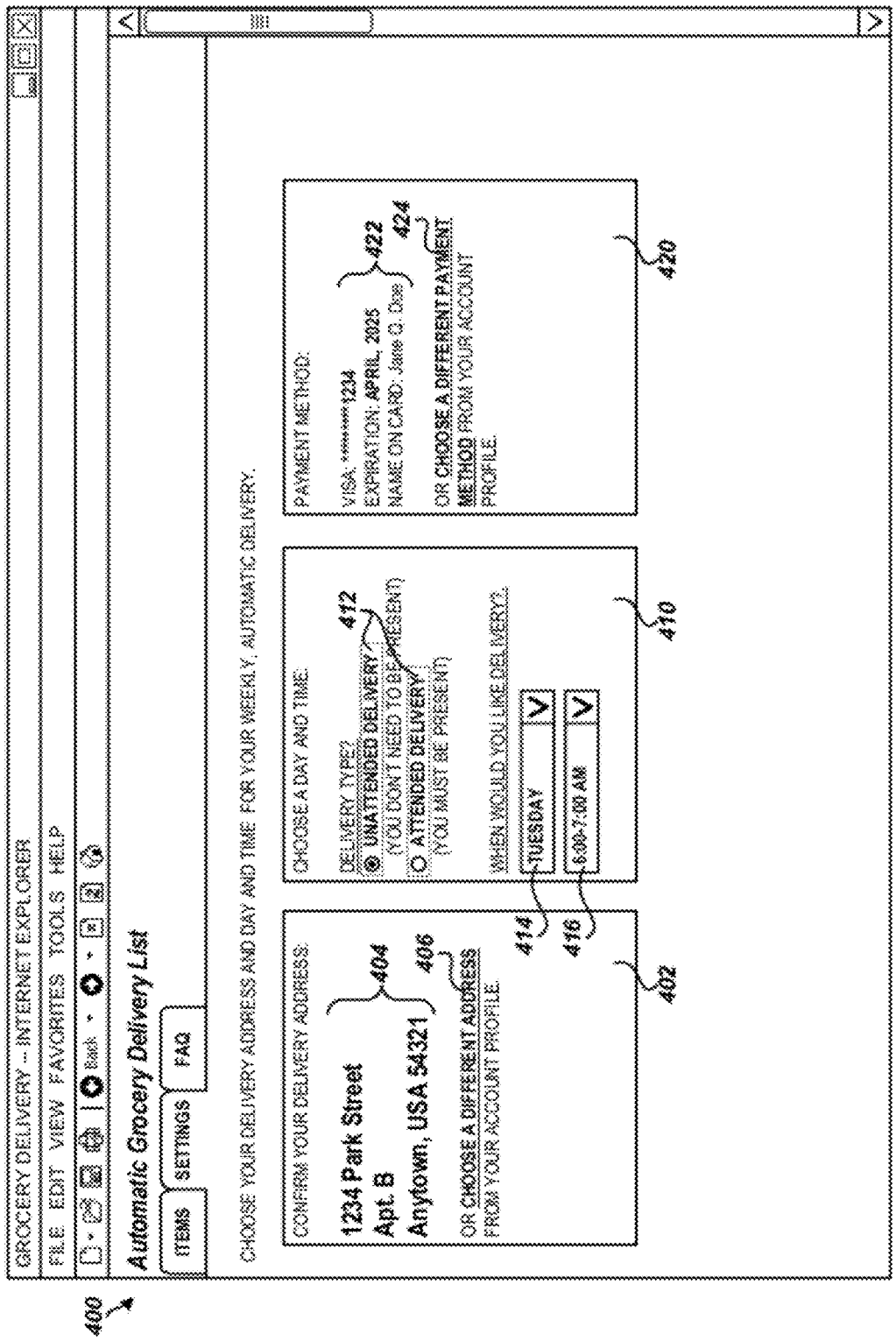
FIG. 4 is a display diagram showing an illustrative user interface for specifying parameters for a recurring delivery list, according to embodiments presented herein.

FIG. 4 shows an illustrative user interface 400 for specifying parameters for the recurring delivery list 126, according to one embodiment. As described above in regard to FIG. 1, the recurring delivery module 124 may operate in conjunction with the customer computer 104 to present the user interface 400 to the customer 102 to allow the customer to specify a delivery address 206, a delivery slot 208, and a payment method 210 for the recurring delivery list 126. The recurring delivery module 124 may present the user interface 400 to the customer 102 by sending a series of web pages to the customer computer 104 to be rendered by a browser application executing on the customer computer, for example. As shown in FIG. 4, the user interface 400 may include a group of UI components 402 for specifying the delivery address 206, a group of UI components 410 for specifying the delivery slot 208, and a group of UI components 420 for specifying the payment method 210.

The group of UI components 402 for specifying the delivery address 206 may include an address display 404 that shows the current delivery address 206 for the recurring delivery list 126. In one embodiment, the address display 404 initially contains a default delivery address for the customer 102 retrieved from the customer profile data maintained by the merchant system 120. The group of UI components 402 may also contain a change address trigger control 406. The change address trigger control 406 may be a hyperlink as shown in FIG. 4, for example.

When the customer 102 selects the change address trigger control 406, the recurring delivery module 124 may present additional UI components (not shown) to the customer that allow the customer to change the currently specified delivery address 206. In one embodiment, the additional UI components may allow the customer 102 to select a delivery address 206 from a list of valid or verified delivery addresses maintained in the customer profile data. In another embodiment, the additional UI components may allow the customer 102 to specify the street address of the location where delivery is to be made.

The group of UI components 410 for specifying the delivery slot 208 may include a delivery type selection control 412. The delivery type selection control 412 may be a series of radio button UI controls as shown in FIG. 4, for example. The delivery type selection control 412 allows the customer 102 to select between unattended-type delivery and attended-type delivery, as was described above in regard to FIG. 2. The group of UI components 410 may also contain a day selection control 414 and a time period selection control 416, which may be dropdown controls as further shown in FIG. 4, for example. The day selection control 414 and time period selection control 416 together allow the customer 102 to select the desired delivery slot 208 from a list of valid or available delivery slots, as further described above in regard to FIG. 2.

For example, for a weekly delivery cycle, the day selection control 414 may allow the customer 102 to select a day of the week from a list of days of the week on which deliveries take place. Similarly, the time period selection control 416 may allow the customer 102 to select a time period from a list of predefined periods available for the selected day of the week, as described above in regard to FIG. 2. According to one embodiment, the days of the week available in the day selection control 414 and the predefined periods available in the time period selection control 416 are limited to those combinations that are valid for the type of delivery selected in the delivery type selection control 412. In other words, the customer 102 may only select a delivery slot 208 designated as unattended if unattended-type delivery is selected in the delivery type selection control 412, and a delivery slot designated as attended if attended-type delivery is selected in the delivery type selection control.

The group of UI components 420 for specifying the payment method 210 may include a payment method display 422 that shows the current payment method 210 for the recurring delivery list 126. In one embodiment, the payment method display 422 may initially contain a default payment method for the customer 102 retrieved from the customer profile data maintained by the merchant system 120. The group of UI components 420 may also contain a change payment method trigger control 424. The change payment method trigger control 424 may be a hyperlink as shown in FIG. 4, for example.

When the customer 102 selects the change payment method trigger control 424, the recurring delivery module 124 may present additional UI components (not shown) to the customer that allow the customer to change the currently specified payment method 210. In one embodiment, the additional UI components may allow the customer 102 to select a payment method 210 from a list of valid or verified payment methods maintained in the customer profile data. In another embodiment, the additional UI components may allow the customer 102 to specify credit card information, checking account information, or other information describing a method of payment for the recurring delivery list 126. It will be appreciated that the UI components described above may be presented to the customer 102 in addition to other UI controls and components displayed at the customer computer 104.

Figure 5:
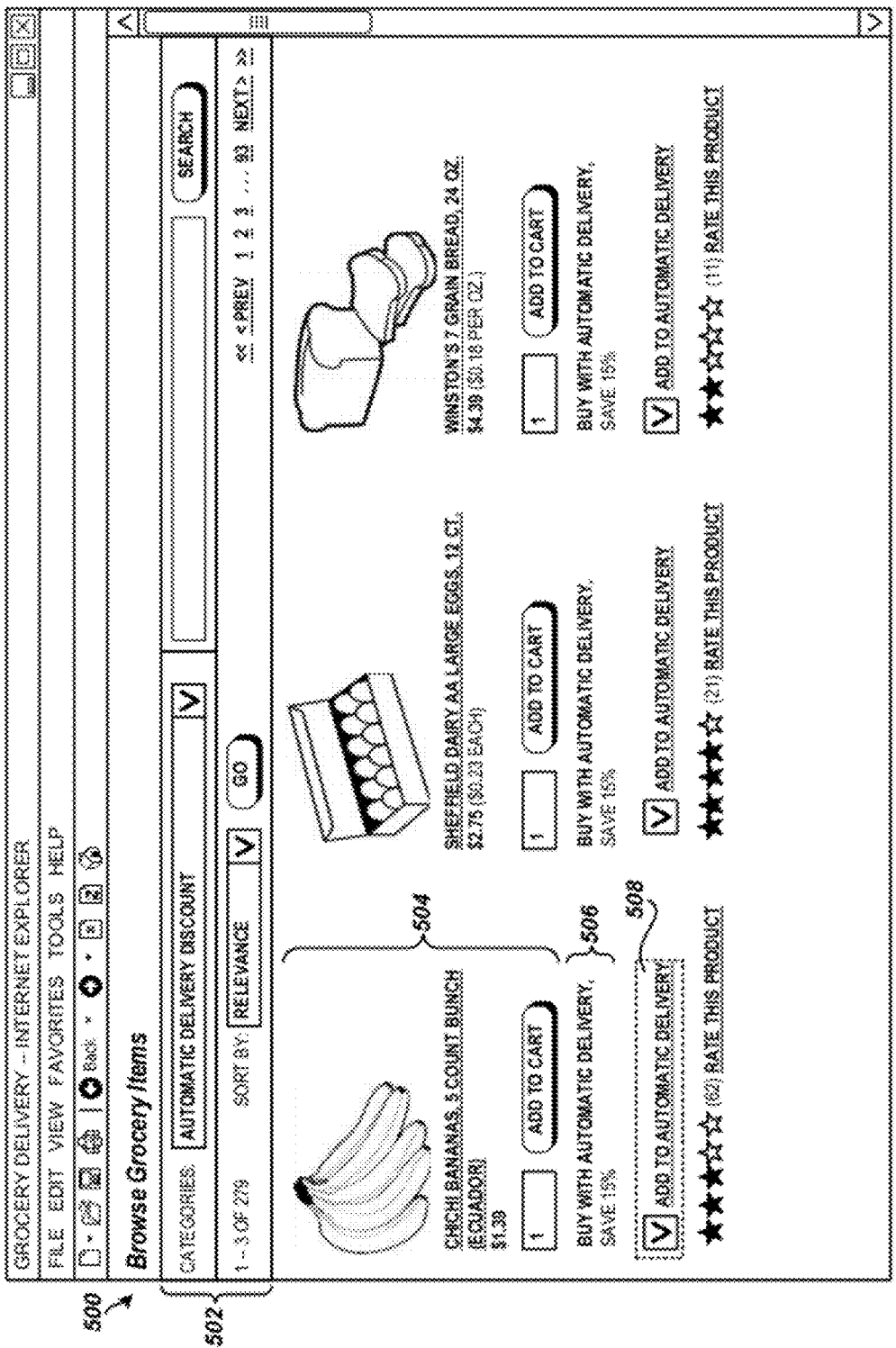
FIGS. 5-7 are display diagrams showing an illustrative user interface for adding items to the recurring delivery list, according to embodiments presented herein.
Figure 6:
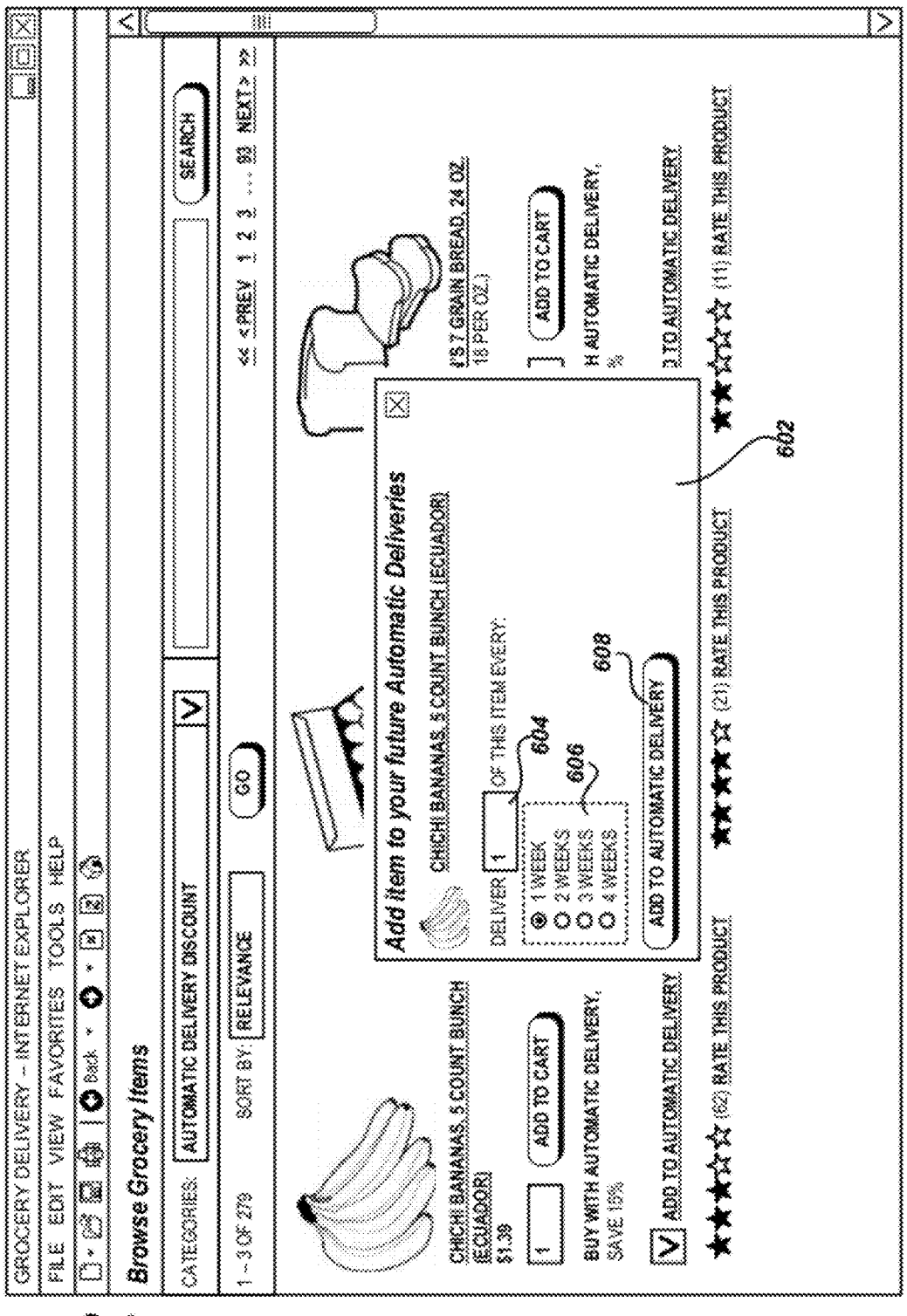
Figure 7:
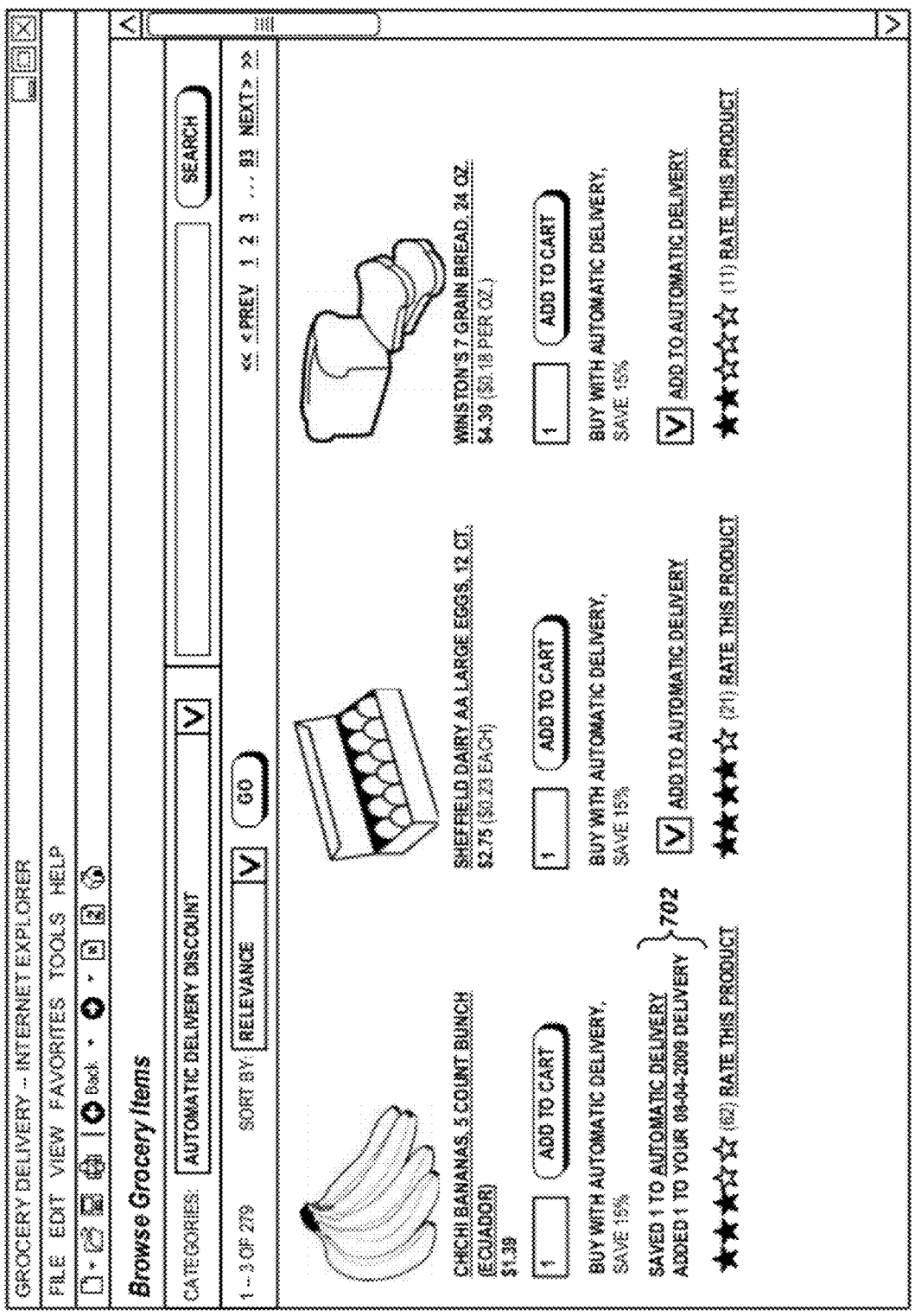

FIGS. 5-7 show an illustrative user interface 500 for selecting products to add to the recurring delivery list 126, according to one embodiment. As described above in regard to FIG. 1, the recurring delivery module 124 may present the user interface 500 to the customer 102 to allow the customer to select products to add to the recurring delivery list 126, as well as specify a quantity 224 and frequency of delivery 226 for each selected product. The recurring delivery module 124 may present the user interface 500 to the customer 102 by sending a series of web pages to the customer computer 104 to be rendered by a browser application executing on the customer computer, for example.

As shown in FIG. 5, the user interface 500 may include a product search interface 502 that allows the customer 102 to browse products by category or search for specific keywords or product SKUs. In addition, the product search interface 502 may allow the customer 102 to sort and page through the resulting list of products. For each product in the resulting list of products, the user interface 500 may include a product information display 504 that contains an image or other pictorial representation of the product, the name of the product, the price of the product, etc. In addition, the product information display 504 may include UI components that allow the product to be added to a traditional, non-recurring order to be filled through the order fulfillment system 140.

According to one embodiment, some products available for purchase through the merchant system 120 may be purchased at a discounted price if purchased on a recurring basis by adding the product to the recurring delivery list 126. The discount offered for recurring delivery may be in addition to other discounts offered for the product in the merchant system 120, such as case quantity discounts and the like. Those products available for purchase at a discount if added to the recurring delivery list 126 may be indicated in the user interface 500 by an additional discount display 506, as shown in FIG. 5.

The user interface 500 also includes an add product trigger control 508, such as the hyperlink shown in FIG. 5. When the customer 102 selects the add product trigger control 508, the recurring delivery module 124 may present additional UI components 602 to the customer that allow the customer to specify a quantity 224 and frequency of delivery 226 for the selected product, as shown in FIG. 6. In one embodiment, the additional UI components 602 include a quantity entry control 604, such as the text entry control shown in FIG. 6, for example. The quantity entry control 604 allows the customer 102 to specify a quantity 224 of the product to order on a recurring basis.

The additional UI components 602 also include a frequency selection control 606. The frequency selection control 606 may be a series of radio button UI controls as further shown in FIG. 6, for example. The frequency selection control 606 allows the customer 102 to specify the frequency of delivery 226 of the selected product. For example, for a weekly delivery cycle, the frequency of delivery 226 may allow the customer 102 to select a frequency of every week, every two weeks, every three weeks, etc. It will be appreciated that for other recurring delivery cycles, such as monthly, the frequency selection control 606 may offer different selections accordingly.

The additional UI components 602 further include an add trigger control 608, such as the pushbutton UI control shown in FIG. 6. When the customer 102 selects the add trigger control 608, the recurring delivery module 124 adds the selected product to the recurring delivery list 126 with the specified quantity 224 and frequency of delivery 226, as will be described in more detail below in regard to FIG. 12.

According to one embodiment, once a product is added to the recurring delivery list 126, the recurring delivery module 124 displays a recurring delivery indicator display 702 for the product in the user interface 500 in place of the add product trigger control 508, as shown in FIG. 7. The recurring delivery indicator display 702 may indicate the quantity 224 of the product added to the recurring delivery list 126. In addition, the recurring delivery indicator display 702 may also indicate that the specified quantity 224 of the product has been added to a currently pending order 132 generated from the recurring delivery list 126, as will be described in more detail below in regard to FIG. 13.

FIGS. 8-11 show an illustrative user interface 800 for maintaining the recurring delivery list 126 and any pending orders 132 generated from the recurring delivery list, according to one embodiment. As described above in regard to FIG. 1, the recurring delivery module 124 may present the user interface 800 to the customer 102 to allow the customer to manage the product selections and other parameters in the recurring delivery list 126. This may include changing the quantity 224 and/or frequency of delivery 226 of a product or suspending the delivery of a product for a specified period or indefinitely. As described above, the recurring delivery module 124 may present the user interface 800 to the customer 102 by sending a series of web pages to the customer computer 104 to be rendered by a browser application executing on the customer computer, for example.

The user interface 800 may include a delivery information display 802 that shows the currently specified delivery slot 208 for the recurring delivery list 126 and the corresponding delivery type, as described above in regard to FIG. 2. The user interface 800 may also include a pause recurring delivery trigger control 804, such as the pushbutton UI control shown in FIG. 8. According to one embodiment, if the customer 102 selects the pause recurring delivery trigger control 804, the recurring delivery module 124 will cease generation of orders 132 from the recurring delivery list 126 as well as cancel any pending order generated from the recurring delivery list. The recurring delivery list 126 may remain "paused" in this manner until a future action by the customer 102, for example.

Figure 8:
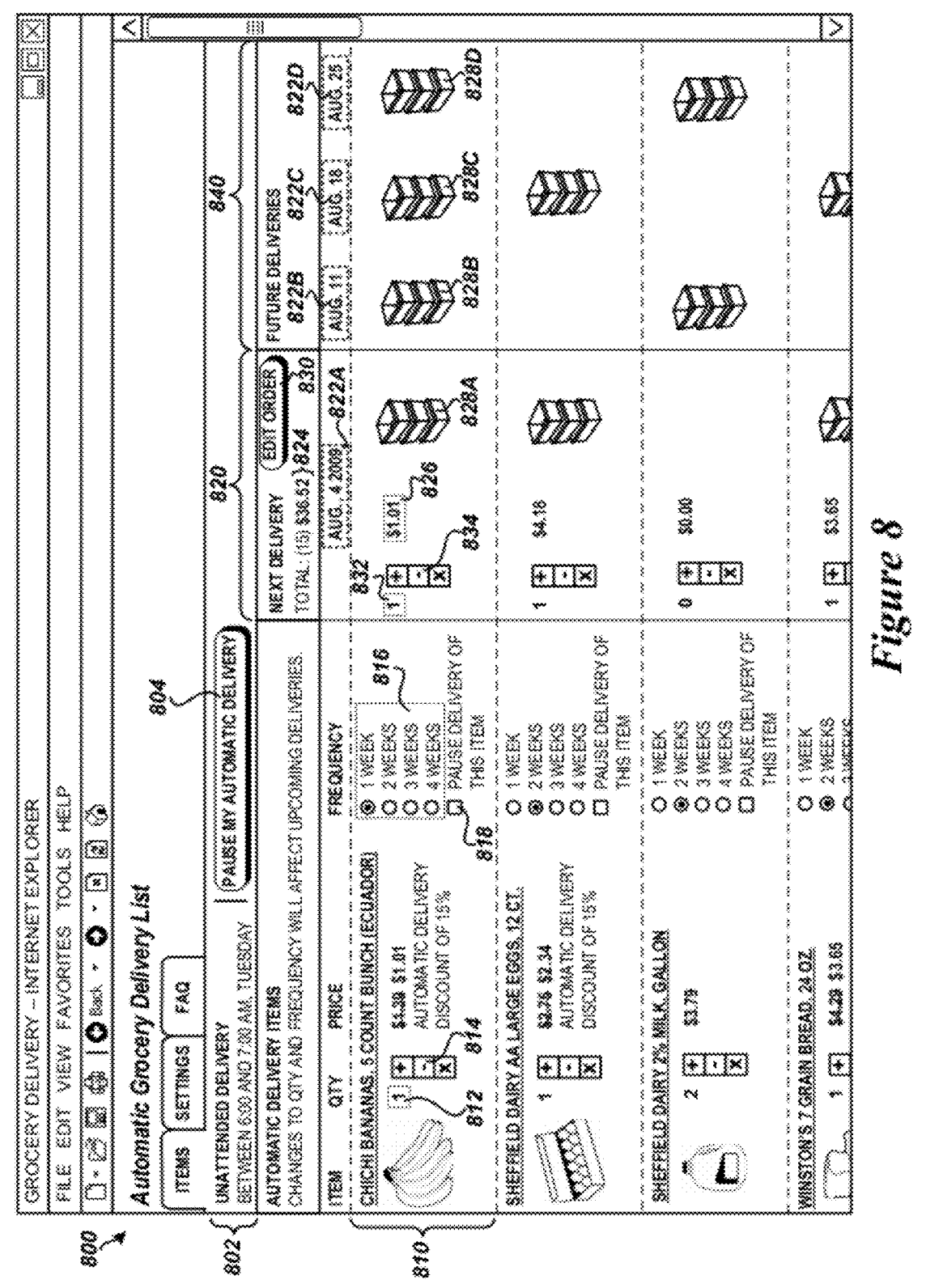

The user interface 800 further includes an item row 810 for each list item 220 in the recurring delivery list 126. The item row 810 contains UI components that display information regarding the product identified by the product SKU 222 of the list item 220. For example, each item row 810 may contain the name of the product, an image or other pictorial representation of the product, the price of the product, etc., as shown in FIG. 8. If the product is available for purchase at a discount if added to the recurring delivery list 126, the discounted price may be displayed in the item row 810 as well.

Each item row 810 may contain a quantity display 812 that displays the currently specified quantity 224 for the list item 220. In one embodiment, the item row 810 also contains a quantity change control 814. The quantity change control 814 may be a series of pushbutton UI controls such as those shown if FIG. 8, for example. The quantity change control 814 may allow the customer 102 to add to or subtract from the quantity 224 for the list item 220, or remove the list item from the recurring delivery list 126 altogether.

In a further embodiment, the item row 810 also contains a frequency selection control 816. The frequency selection control 816 may be a series of radio button UI controls as further shown in FIG. 8, for example. The frequency selection control 816 shows the currently specified frequency of delivery 226 for the list item as well as allowing the customer 102 to modify the frequency of delivery. The item row 810 may also contain a pause item trigger control 818, such as the checkbox shown in FIG. 8, for example. The pause item trigger control 818 is described in more detail below.

The user interface 800 may further include a group of UI components 820 that provides information regarding the currently pending order 132 generated from the recurring delivery list 126. As will be described below in regard to FIG. 12, orders may be generated from the recurring delivery list 126 in advance of the scheduled delivery, so that an order 132 remains pending for a period of time before delivery. The group of UI components 820 may contain a delivery date display 822 that displays the date of delivery of the pending order 132, as well as a summary display 824 that displays summary information regarding the pending order, such as the total quantity of products to be delivered, the order total 306, etc.

Further, for each item row 810, the group of UI components 820 may display information regarding the order item 308 from the pending order 132 corresponding to the list item 220 displayed in the item row. For example, the group of UI components 820 may contain a quantity display 832 that displays the quantity 224 from the order item 308 as well as a price display 826 that displays the price 310 from the order item, as shown in FIG. 8. The group of UI components 820 may further contain a delivery indicator icon 828A that provides a visual indication to the customer 102 that the product identified in the list item 220 is included in the pending order 132.

According to one embodiment, the group of UI components 820 may contain additional components that allow the customer 102 to modify the currently pending order 132. For example, the group of UI components 820 may also contain an edit order trigger control 830, such as the pushbutton UI control shown in FIG. 8. If the customer 102 selects the edit order trigger control 830, a quantity change control 834 may be enabled in each item row 810 that allows the customer 102 to add to or subtract from the quantity 224 for the order item 308, or remove the order item from the pending order 132.

In a further embodiment, changes made to the currently pending order 132 are not reflected in the recurring delivery list 126. For example, if the customer uses the quantity change control 834 to modify the quantity 224 of an order item 308, the quantity 224 of the corresponding list item 220 in the recurring delivery list 126 remains the same. Similarly, if the customer uses the quantity change control 834 to remove an order item 308 from the currently pending order 132, the last delivery date 228 of the corresponding list item 220 in the recurring delivery list 126 may still indicate that the product was delivered on the delivery date of the currently pending order. In this way, changes made to the order items 308 in the currently pending order will not affect the schedule for delivery of the corresponding product in future orders 136 generated from the recurring delivery list 126.

The user interface 800 may further include a group of UI components 840 that provides information regarding a number of scheduled future orders 132 that may be generated from the recurring delivery list 126. The group of UI components 840 may contain a delivery date display 822B-822C that displays the date of delivery of the future orders. In addition, a number of delivery indicator icons 828B-828D may be displayed in each item row 810 that indicate if the product identified in the corresponding list item 220 is to be included in each of the future orders. It will be appreciated that the recurring delivery module 124 may utilize the frequency of delivery 226 and the last delivery date 228 of the list item 220 to identify the products that are to be included in each of the future orders.

Figure 9:

As will be described below in regard to FIG. 13, changes made to the recurring delivery list 126 may also be applied to the currently pending order 132, according to embodiments. For example, if the customer 102 utilizes the quantity change control 814 in the item row 810 shown in FIG. 8 to increment the quantity 224 of the corresponding list item 220, or utilizes the frequency selection control 816 to change the frequency of delivery 226 of the list item, the recurring delivery module 124 may apply these changes to both the recurring delivery list 126 and the currently pending order 132. As shown in FIG. 9, the change to the quantity 224 and frequency of delivery 226 as applied to the list item 220 of the recurring delivery list 126 may be reflected in the quantity display 812 and the frequency selection control 816 of the item row 810 corresponding to the list item 220.

In addition, the change to the quantity 224 as applied to order item 308 of the currently pending order 132 may also be reflected in the quantity display 832 in the group of UI components 820 for the item row 810. Other components of the group of UI components 820 may reflect the change to the quantity 224 of the order item 308 as well, including the price display 826 and the summary display 824, as further shown in FIG. 9. Similarly, the change to the frequency of delivery 226 may be further reflected in the delivery indicator icons 828C displayed in the group of UI components 840 corresponding to the scheduled future orders, as shown in FIG. 9.

As shown in FIGS. 8 and 9, the item row 810 in the user interface 800 may also contain a pause item trigger control 818. As described above in regard to FIG. 1, the recurring delivery module 124 may allow the customer 102 to suspend, or "pause," the delivery of a product in the recurring delivery list 126 for a specified period of time or indefinitely. When the customer 102 selects the pause item trigger control 818, the recurring delivery module 124 may present additional UI components 1002 to the customer that allow the customer to specify the parameters for pausing the product identified in the corresponding list item 220, as shown in FIG. 10.

In one embodiment, the additional UI components 1002 include a pause type selection control 1004, such as the series of radio button UI controls shown in FIG. 6, for example. The pause type selection control 1004 allows the customer 102 to specify the whether the product is to be paused indefinitely or until a specific date. The additional UI components 1002 may also include a date entry control 1006, such as the date drop-down control shown in FIG. 10. The date entry control 1006 allows the customer 102 to specify the paused-to date 230 in the case where the customer has specified that delivery of the product is to be paused until a specific date.

Figure 10:

The additional UI components 1002 further include a pause trigger control 1008, such as the pushbutton UI control shown in FIG. 10. When the customer 102 selects the pause trigger control 1008, the recurring delivery module 124 stores the specified paused-to date 230 in the corresponding list item 220, so that the product identified in the list item will not be included in future orders generated from the recurring delivery list 126. According to one embodiment, the recurring delivery module 124 may also remove the product identified in the list item from the currently pending order 132 generated from the recurring delivery list 126, as will be described in more detail below in regard to FIG. 14.

Figure 11:
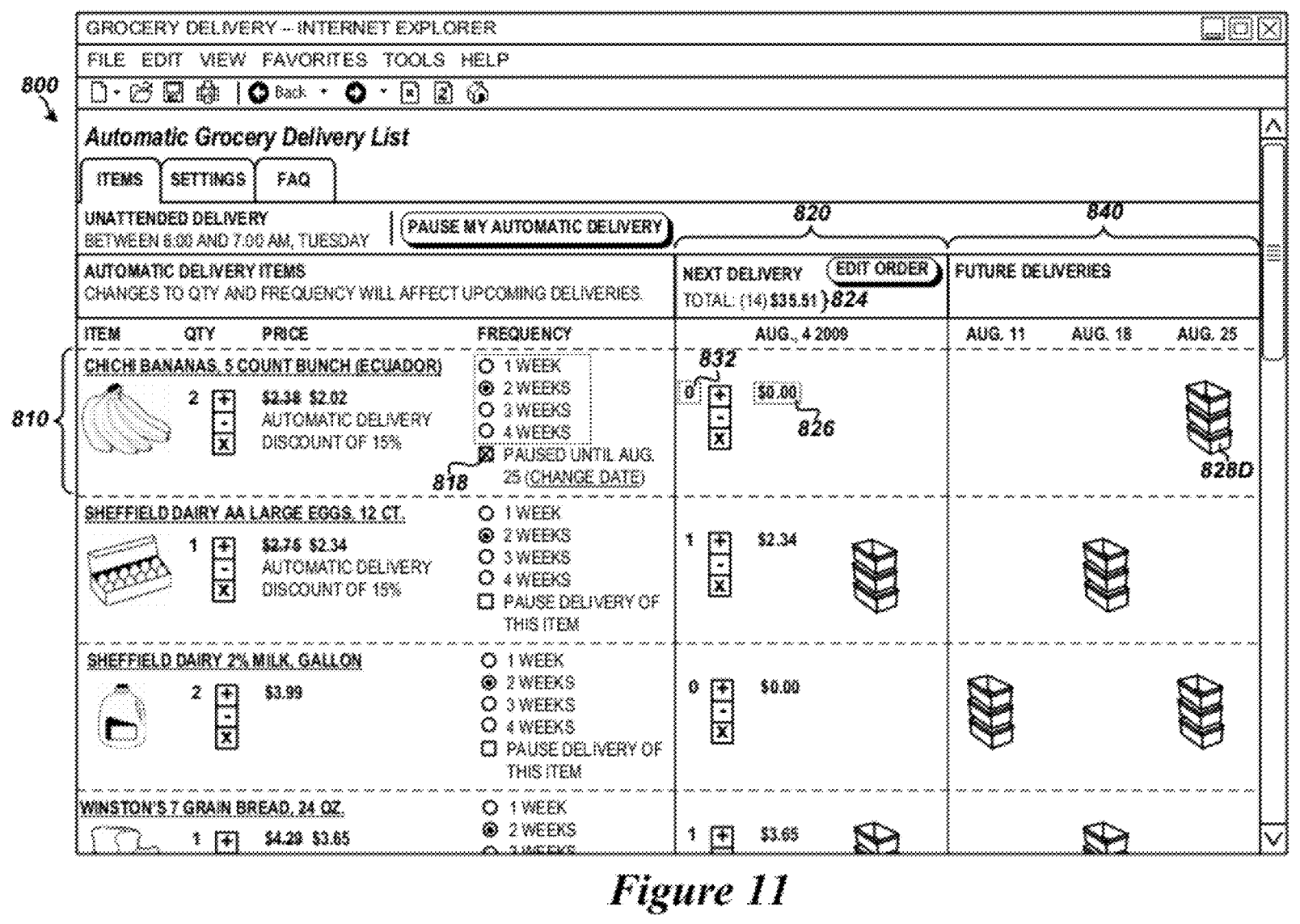

As shown in FIG. 11, once delivery of a product has been paused, the recurring delivery module 124 may change the pause item trigger control 818 in the corresponding item row 810 to indicate that the item has been paused until the specified paused-to date 230. In addition, the affect of pausing the product on the currently pending order 132 may also be reflected in the quantity display 832 and price display 826 in the group of UI components 820 for the item row 810, as well as the summary display 824 for the pending order. Similarly, the affect of pausing delivery of the product on future orders may be further reflected in the delivery indicator icons 828B-828D displayed in the group of UI components 840 corresponding to the scheduled future orders, as further shown in FIG. 11.

It will be appreciated that the UI controls and components shown in the accompanying drawings are provided as example implementations only, and that other UI controls and components known in the art may be utilized in the user interfaces 400, 500, and 800 to provide the functionality described above. The implementation is a matter of choice, and may depend on the technology utilized by the recurring delivery module 124 to present the user interfaces 400, 500, and 800 to the customer 102, the type of the customer computer 104 on which the user interfaces are rendered, and other factors. It will be further appreciated that the user interfaces 400, 500, and 800 shown in the figures may appear differently on different types of customer computers 104.

Figure 14:
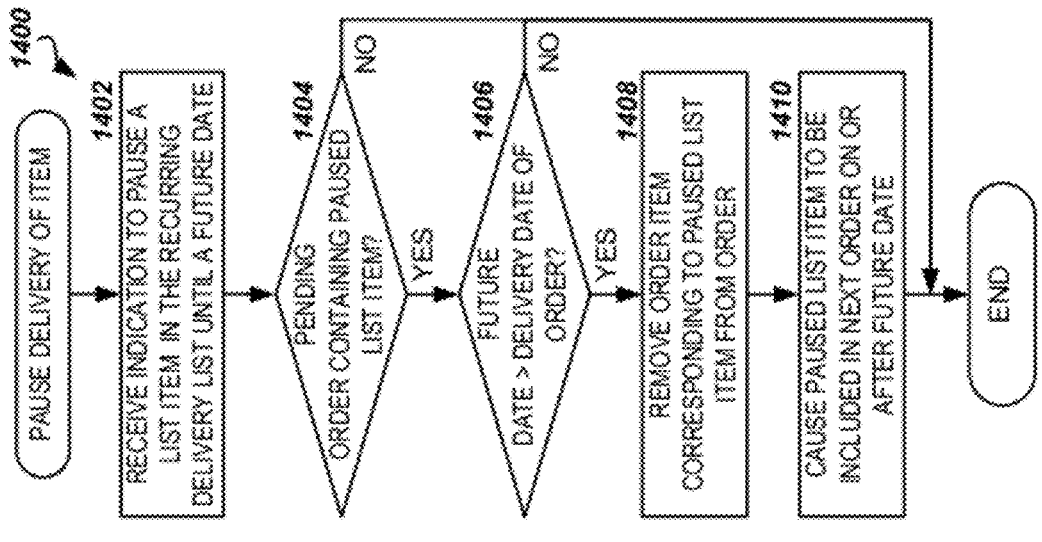
FIG. 14 is a flow diagram showing methods for pausing the delivery of a product in a recurring delivery list, according to embodiments described herein.
Figure 13:
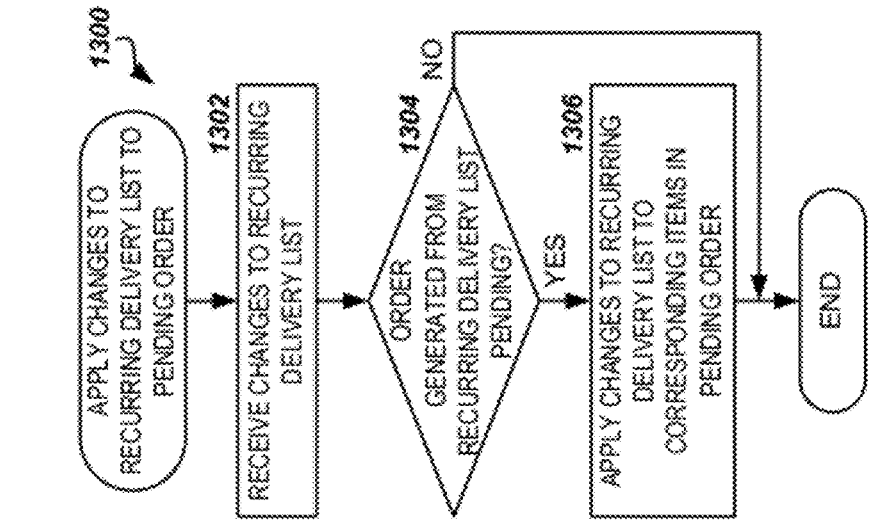
FIG. 13 is a flow diagram showing methods for applying changes made to a recurring delivery list to a pending order generated from the recurring delivery list, according to embodiments described herein.
Figure 12:
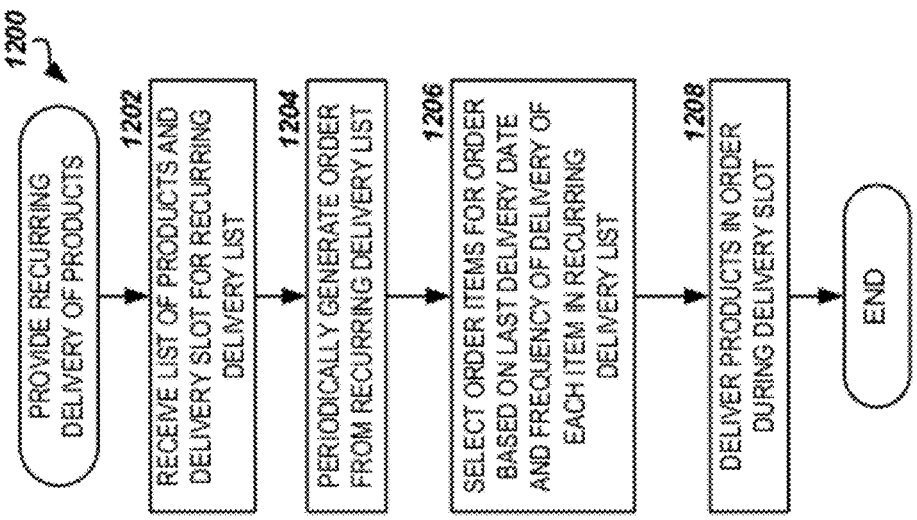
FIG. 12 is a flow diagram showing methods for providing recurring delivery of products to a customer on a periodic basis, according to embodiments described herein.

Turning now to FIGS. 12-14, additional details will be provided regarding the embodiments presented herein for providing recurring delivery of products to a customer on a periodic basis. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 12 illustrates a routine 1200 for providing recurring delivery of products to a customer on a periodic basis, according to embodiments described herein. In one embodiment, the routine 1200 is performed by the recurring delivery module 124. It will be appreciated that the routine 1200 may also be performed by another module or component of the merchant system 120, or by a combination of modules and components.

The routine 1200 begins at operation 1202, where the recurring delivery module 124 receives a list of products to add to the recurring delivery list 126. According to one embodiment, the list of products is received from the customer 102 through a user interface 500 presented to the customer at the customer computer 104, as described above in regard to FIGS. 5 and 6. The customer 102 may utilize the user interface 500 to specify one or more products to add to the recurring delivery list 126, along with a quantity 224 and frequency of delivery 226 for each.

In another embodiment, the recurring delivery module 124 generates a suggested list of products by analyzing profile data maintained for the customer 102 in the merchant system 120. For example, the recurring delivery module 124 may utilize the purchase history of the customer 102 along with other profile information, such as age, gender, income level, interests, search history, etc., to select products that should be delivered to the customer on a recurring basis. The recurring delivery module 124 may further couple this information with data identifying the number of people in the customer's household and/or information regarding the shelf life of the selected products to determine an appropriate quantity 224 and frequency of delivery 226 for each product. This automatic generation of the list of products may be performed when the recurring delivery list 126 is initially created by the customer 102, for example.

In a further embodiment, the recurring delivery module 124 may retrieve the list of products to add to the recurring delivery list 126 from an existing order of the customer 102. For example, after placing a traditional order in the merchant system 120, the customer 102 may be given the option to add some or all of the products in the order to their recurring delivery list 126. If the customer 102 selects the option to add the products from the order to the recurring delivery list 126, the recurring delivery module 124 may add a list item 220 to the recurring delivery list for each product in the order. The recurring delivery module 124 may then present the user interface 800 to the customer 102 to allow the customer to change the quantity 224 and/or frequency of delivery 226 of each newly added product, as described above in regard to FIGS. 8-11.

The recurring delivery module 124 may also receive a specification of a delivery slot 208 for the recurring delivery list 126. The specification of the delivery slot 208 may also be received from the customer 102 through a user interface 400 presented to the customer at the customer computer 104, as described above in regard to FIG. 4. As described above in regard to FIG. 2, the delivery slot 208 may be an identifier of one of a number of predetermined periods of time within the recurring delivery cycle that may be scheduled for delivery. In one embodiment, the specification of the delivery slot 208 may further include a designation of an unattended-type delivery or an attended-type delivery, as further described above in regard to FIGS. 2 and 4.

It will be appreciated that the recurring delivery module 124 may receive the list of products to add to the recurring delivery list 126 and the specification of a delivery slot 208 from sources other than those described herein. Upon receiving the list of products and the delivery slot 208, the recurring delivery module 124 may create the recurring delivery list 126 in the data storage system 128 with the specified delivery slot and a list item 220 for each of the products. The quantity 224 and frequency of delivery 226 for each list item 220 are also established from the received values.

From operation 1202, the routine 1200 proceeds to operation 1204, where the recurring delivery module 124 periodically generates an order 132 from the recurring delivery list 126. As described above in regard to FIG. 1, the recurring delivery module 124 may use services provided by the order module 130 to generate the order 132. The period of generation of the orders 132 may depend on the recurring delivery cycle. For example, for a weekly delivery cycle, the recurring delivery module 124 may generate an order 132 from the recurring delivery list 126 each calendar week. The order 132 may be generated with a date and time for delivery 304 corresponding to the next occurrence of the delivery slot 208 specified in the recurring delivery list 126. In addition, the recurring delivery module 124 may generate the order 132 from the recurring delivery list 126 in advance of the date and time for delivery 304, so that the order remains pending for a period of time before delivery. In one embodiment, the recurring delivery module 124 may generate orders 132 seven days in advance for a weekly delivery cycle.

The routine 1200 proceeds from operation 1204 to operation 1206, where the recurring delivery module 124 creates order items 308 for the generated order 132 from the list items 220 in the recurring delivery list 126. The recurring delivery module 124 may utilize the frequency of delivery 226 and the last delivery date 228 of each list item 220 to determine which products to include in the order 132. For example, if the frequency of delivery 226 of a list item 220 specifies that a product is to be delivered every two weeks, and the last delivery date 228 of the list item indicates that the item was delivered at least two weeks prior to the date and time for delivery 304 of the generated order 132, then an order item 308 is added to the order with the product SKU 222 and quantity 224 from the corresponding list item. In a further embodiment, the recurring delivery module 124 also checks the paused-to date 230 of the list item 220 to ensure that the delivery of the product has not been paused by the customer 102 before adding the order item 308 to the order 132.

From operation 1206, the routine 1200 proceeds to operation 1208, where the products specified in the order items 308 of the generated order 132 are delivered to the customer effectively on the date and time for delivery 304 of the order. As described above in regard to FIG. 1, the delivery of the order 132 may be performed by an order fulfillment system 140 within the merchant system 120. The order fulfillment system 140 may be required to perform additional processing because of the automatic nature of the orders 132 generated from the recurring delivery list 126. For example, the order fulfillment system 140 may be required to substitute equivalent products for products included in the order 132 that are out of stock or discontinued. The substitution of equivalent items may be an option selected by the customer 102, either globally for the recurring delivery list 126 or on a list item 220 by list item basis. The substitution of equivalent items for products that are discontinued may be made in both the pending order 132 as well as the recurring delivery list 126.

FIG. 13 illustrates a routine 1300 for applying changes made to the recurring delivery list 126 to a pending order 132 generated from the recurring delivery list, according to the embodiments described herein. In one embodiment, the routine 1300 is performed by the recurring delivery module 124. It will be appreciated that the routine 1300 may also be performed by another module or component of the merchant system 120, or by a combination of modules and components. As described above in regard to FIG. 12, the recurring delivery module 124 may generate an order 132 from the recurring delivery list 126 in advance of the date and time for delivery 304, so that the order remains pending for a period of time before delivery. Changes made to the recurring delivery list 126 during the period of pendency of the generated order 132 may also be applied to the order.

The routine 1300 begins at operation 1302, where the recurring delivery module 124 receives the changes made to the recurring delivery list 126. According to one embodiment, the changes may have been made by the customer 102 through a user interface 800 presented to the customer at the customer computer 104, as described above in regard to FIGS. 8 and 9. The changes may include changes to the quantity 224 and/or frequency of delivery 226 of a list item 220 in the recurring delivery list 126.

From operation 1302, the routine 1300 proceeds to operation 1304, where the recurring delivery module 124 determines if an order 132 generated from the recurring delivery list 126 is currently pending. According to one embodiment, the order 132 is generated from the recurring delivery list 126 in advance of the date and time for delivery 304 based on the recurring delivery cycle such that there is effectively always a pending order 132 associated with the recurring delivery list. If the recurring delivery module 124 determines there is not a currently pending order 132, the routine 1300 ends.

If the recurring delivery module 124 determines there is a currently pending order 132 generated from the recurring delivery list 126, the routine 1300 proceeds to operation 1306, where the recurring delivery module 124 applies the changes made to the recurring delivery list 126 to pending order 132. For example, changes made to the quantity 224 of a list item 220 in the recurring delivery list 126 may also be made to the quantity 224 of any corresponding order item 308 in the order 132. Or, if changes made to the frequency of delivery 226 of a list item 220 indicate that the product identified by the list item is no longer scheduled for delivery on the date and time of delivery 304 of the pending order 132, then the order item 308 corresponding to the list item may be removed from the pending order.

It will be appreciated that the recurring delivery module 124 may similarly apply other changes made to the recurring delivery list 126 or the list items 220 to the corresponding pending order 132 or order items 308. It will be further appreciated that the recurring delivery module 124 may selectively apply some changes made to the recurring delivery list 126 to the pending order 132, while not applying others changes made to the recurring delivery list. For example, if the customer 102 changes the delivery slot 208 specified for the recurring delivery list 126, the recurring delivery module 124 may apply the change to future orders 132 generated from the recurring delivery list, while leaving the date and time for delivery 304 of the currently pending order unchanged. From operation 1306, the routine 1300 ends.

FIG. 14 illustrates a routine 1400 for pausing the delivery of a product in the recurring delivery list 126, according to the embodiments described herein. In one embodiment, the routine 1400 may be performed by the recurring delivery module. It will be appreciated that the routine 1400 may also be performed by another module or component of the merchant system 120, or by a combination of modules and components. As described above in regard to FIG. 1, the recurring delivery module 124 may allow the customer 102 to pause the delivery of a product in the recurring delivery list 126 for a specified period of time or indefinitely. When a product in the recurring delivery list 126 is paused, the change may also be applied to any pending order 132 generated from the recurring delivery list 126.

The routine 1400 begins at operation 1402, where the recurring delivery module 124 receives an indication that a product identified in a list item 220 of the recurring delivery list 126 is to be paused until a future date. According to one embodiment, the customer 102 may pause delivery of the product through a user interface 800 presented to the customer at the customer computer 104, as described above in regard to FIGS. 9-11.

From operation 1402, the routine 1400 proceeds to operation 1404, where the recurring delivery module 124 determines if there is a pending order 132 generated from the recurring delivery list 126 that includes an order item 308 created from the paused list item 220. If no order 132 generated from the recurring delivery list 126 is pending, or if the currently pending order does not include an order item 308 created from the paused list item 220, then the routine 1400 ends. However, if the currently pending order 132 does include an order item 308 created from the paused list item 220, the routine 1400 proceeds to operation 1406, where the recurring delivery module 124 determines if the future date specified for the paused product is greater than the delivery date of the order 132. This may be determined by comparing the paused-to date 230 on the paused list item 220 to the date and time of delivery 304 on the order 132.

If the paused-to date 230 on the paused list item 220 is not greater than the date and time of delivery 304 on the order 132, the routine 1400 ends. However, if the paused-to date 230 on the paused list item 220 is greater than the date and time of delivery 304 on the order 132, the routine 1400 proceeds to operation 1408, where the recurring delivery module 124 removes the order item 308 corresponding to the paused list item 220 from the order 132. From operation 1408, the routine 1400 then proceeds to operation 1410, where the recurring delivery module 124 causes the product identified in the paused list item 220 to be included in the next order 132 generated from the recurring delivery list 126 after the future date. The recurring delivery module 124 will accomplish this by determining the order items 308 to create in each generated order 132 based on the frequency of delivery 226, the last delivery date 228, and the paused-to date 230 of each list item 220 in the recurring delivery list 126, as described above in regard to FIG. 12. From operation 1410, the routine 1400 ends.

Figure 15:
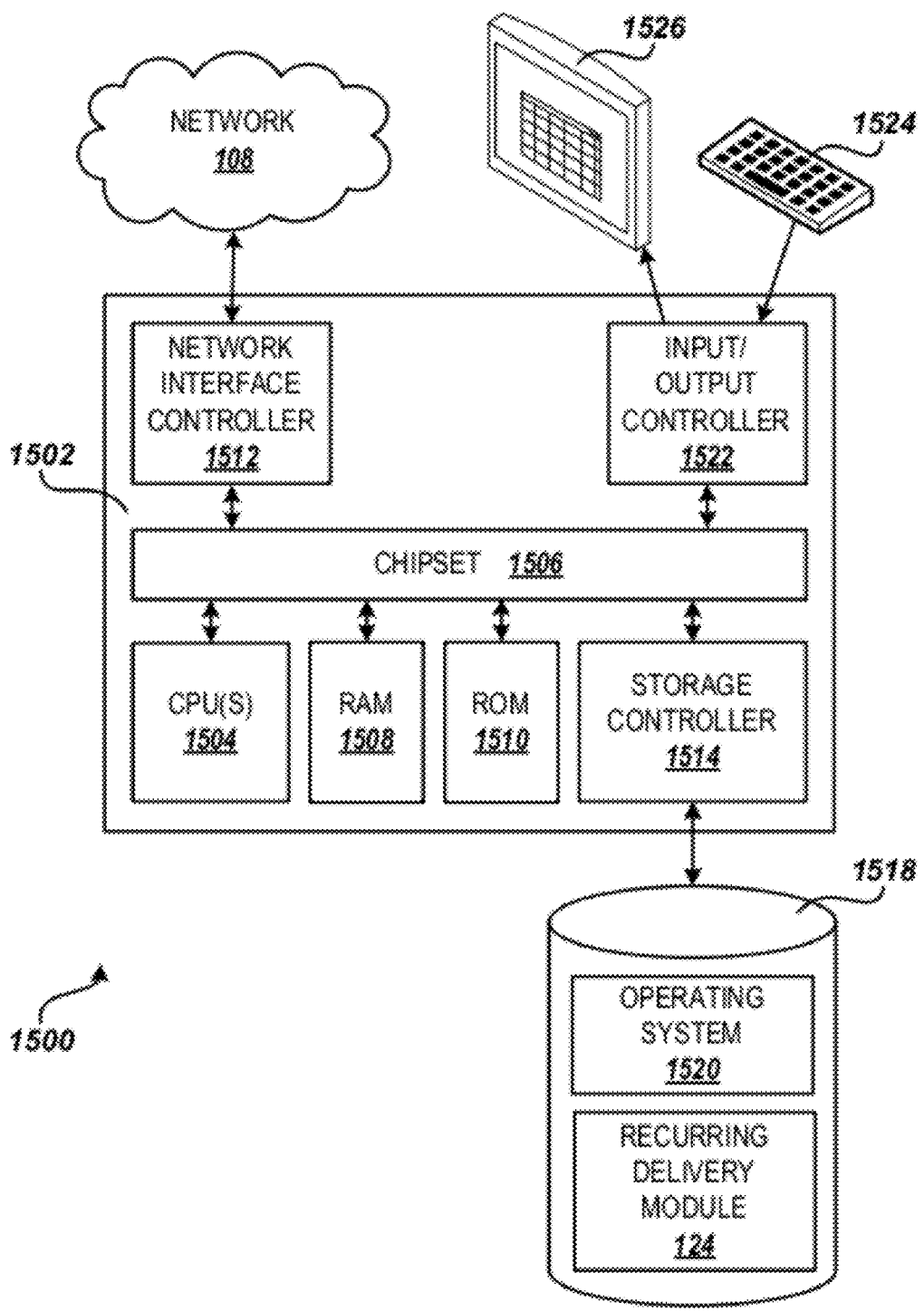
FIG. 15 is a computer architecture diagram showing an illustrative computer hardware architecture for computing devices described in embodiments presented herein.

FIG. 15 shows an example computer architecture 1500 for a computer 1502 capable of executing the software components described herein for providing recurring delivery of products to a customer on a periodic basis, in the manner presented above. The computer architecture 1500 shown in FIG. 15 illustrates a conventional server computer, workstation, desktop computer, laptop, network appliance, personal digital assistant ("PDA"), digital cellular phone, or other computing device, and may be utilized to execute any aspects of the software components presented herein described as executing on the application servers 122, customer computer 104, or other computing platform.

The computer 1502 includes a baseboard, or "motherboard," which is a printed circuit board to which a multitude of components or devices may be connected by way of a system bus or other electrical communication paths. In one illustrative embodiment, one or more central processing units ("CPUs") 1504 operate in conjunction with a chipset 1506. The CPUs 1504 are standard programmable processors that perform arithmetic and logical operations necessary for the operation of the computer 1502.

The CPUs 1504 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1506 provides an interface between the CPUs 1504 and the remainder of the components and devices on the baseboard. The chipset 1506 may provide an interface to a random access memory ("RAM") 1508, used as the main memory in the computer 1502. The chipset 1506 may further provide an interface to a computer-readable storage medium such as a read-only memory ("ROM") 1510 or non-volatile RAM ("NVRAM") for storing basic routines that that help to startup the computer 1502 and to transfer information between the various components and devices. The ROM 1510 or NVRAM may also store other software components necessary for the operation of the computer 1502 in accordance with the embodiments described herein.

According to various embodiments, the computer 1502 may operate in a networked environment using logical connections to remote computing devices and computer systems through the network 108. The chipset 1506 includes functionality for providing network connectivity through a network interface controller ("NIC") 1512, such as a gigabit Ethernet adapter. The NIC 1512 is capable of connecting the computer 1502 to other computing devices over the network 108, such as the customer computer 104, the data storage system 128, other application servers 122, and the like. It should be appreciated that any number of NICs 1512 may be present in the computer 1502, connecting the computer to other types of networks and remote computer systems.

The computer 1502 may be connected to a mass storage device 1518 that provides non-volatile storage for the computer. The mass storage device 1518 may store system programs, application programs, other program modules, and data, which are described in greater detail herein. The mass storage device 1518 may be connected to the computer 1502 through a storage controller 1514 connected to the chipset 1506. The mass storage device 1518 may consist of one or more physical storage units. The storage controller 1514 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 1502 may store data on the mass storage device 1518 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1518 is characterized as primary or secondary storage, and the like. For example, the computer 1502 may store information to the mass storage device 1518 by issuing instructions through the storage controller 1514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1502 may further read information from the mass storage device 1518 by detecting the physical states or characteristics of one or more particular locations within the physical storage units.

In addition to the mass storage device 1518 described above, the computer 1502 may have access to other computer-readable storage medium to store and retrieve information, such as program modules, data structures, or other data. It should be appreciated by those skilled in the art that computer-readable storage media can be any available media that may be accessed by the computer 1502. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 1518 may store an operating system 1520 utilized to control the operation of the computer 1502. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 1518 may store other system or application programs and data utilized by the computer 1502, such as the recurring delivery module 124 described above in regard to FIG. 1. In one embodiment, the mass storage device 1518 or other computer-readable storage media may be encoded with computer-executable instructions that, when loaded into the computer 1502, may transform the computer from a general-purpose computing system into a special-purpose computer capable of implementing the embodiments described herein. These computer-executable instructions transform the computer 1502 by specifying how the CPUs 1504 transition between states, as described above. According to one embodiment, the computer 1502 may have access to computer-readable storage media storing computer-executable instructions that, when executed by the computer, perform the routines 1200, 1300, and 1400 for providing recurring delivery of products to a customer on a periodic basis, as described above in regard to FIGS. 12-14.

The computer 1502 may also include an input/output controller 1522 for receiving and processing input from a number of input devices 1524, such as a keyboard, a mouse, a touchpad, a touch screen, an electronic stylus, or other type of input device. Similarly, the input/output controller 1522 may provide output to a display device 1526, such as a computer monitor, a flat-panel display, a digital projector, a printer, a plotter, or other type of output device. It will be appreciated that the computer 1502 may not include all of the components shown in FIG. 15, may include other components that are not explicitly shown in FIG. 15, or may utilize an architecture completely different than that shown in FIG. 15.

Based on the foregoing, it should be appreciated that technologies for providing recurring delivery of products to a customer on a periodic basis are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing recurring delivery of products, the method comprising performing instructions under the control of a computer system for:

receiving at the computer system a designation of a delivery slot and a recurring delivery list comprising one or more list items, each of the one or more list items identifying a product, a quantity to deliver, and a frequency of delivery;

periodically generating, by the computer system, an order having a date and time for delivery based on a next occurrence of the delivery slot, the order being generated in advance of the date and time for delivery such that the order has a period of time of pendency prior to the delivery;

creating, by the computer system, one or more order items for the order based on a last delivery date and the frequency of delivery of each list item in the recurring delivery list;

receiving at the computer system a change made to a first list item of the recurring delivery list during the period of time of pendency of the order;

in response to receiving the change, determining, by the computer system, whether the order includes an order item corresponding to the first list item;

in response to determining that the order includes an order item corresponding to the first list item, modifying, by the computer system, the order item corresponding to the first list item based on the change made to the first list item of the recurring delivery list; and providing, by the computer system, the order to an order fulfillment system capable of causing the one or more order items to be delivered substantially on the date and time for delivery.

2. The computer-implemented method of claim 1, wherein the change made to the first list item of the recurring delivery list comprises one of removing the first list item, changing the quantity to deliver of the first list item, or changing the frequency of delivery of the first list item.

3. The computer-implemented method of claim 1, further comprising:

during the period of time of pendency of the order, receiving at the computer system a request to pause delivery of a second list item of the recurring delivery list until a specific future date;

determining, by the computer system, whether the order includes an order item corresponding to the second list item;

upon determining that the order includes an order item corresponding to the second list item, determining, by the computer system, whether the specific future date is greater than the date and time for delivery of the order;

upon determining that the specific future date is greater than the date and time for delivery of the order, removing, by the computer system, the order item corresponding to the first second list item from the order; and causing, by the computer system, the second list item to be included in a next generated order having a date and time for delivery on or after the specific future date.

4. The computer-implemented method of claim 1, wherein one or more products identified by the one or more order items are provided at a discounted price if the one or more products are included in the recurring delivery list.

5. The computer-implemented method of claim 1, wherein the delivery slot comprises a day of the week and a period of time during the day.

6. The computer-implemented method of claim 1, wherein the recurring delivery list further specifies that the order may be delivered without a receiver being present and the method further comprises:

determining, by the computer system, that a first list item of the one or more list items is not eligible for unattended delivery; and alerting, by the computer system, a customer associated with the recurring delivery list that the first list item is not eligible for unattended delivery.

7. The computer-implemented method of claim 1, wherein the change made to the first list item comprises a change to the frequency of delivery of the first list item, and wherein the method further comprises:

determining, by the computer system, whether the change to the frequency of delivery of the first list item indicates that the product identified by the first list item is no longer scheduled for delivery on the date and time for delivery of the order; and upon determining that the change to the frequency of delivery of the first list item indicates that the product identified by the first list item is no longer scheduled for delivery on the date and time for delivery of the order, removing, by the computer system, the order item corresponding to the first list item from the order.

8. A computer-readable non-transitory medium having computer-executable instructions stored thereon that, when executed by a computer, cause the computer to:

receive a designation of a delivery slot and a recurring delivery list comprising one or more list items identifying a product, a quantity to deliver, and a frequency of delivery;

periodically generate an order having a date and time for delivery based on a next occurrence of the delivery slot, the order being generated in advance of the date and time for delivery such that the order has a period of time of pendency prior to the delivery;

create one or more order items for the order based on a last delivery date and the frequency of delivery of each list item in the recurring delivery list;

receive changes made to a first list item of the recurring delivery list during the period of time of pendency of the order; and upon receiving the changes, determine whether the order includes an order item corresponding to the first list item, in response to determining that the order includes an order item corresponding to the first list item, modify the order item corresponding to the first list item based on the changes made to the first list item of the recurring delivery list; and provide the order to an order fulfillment system capable of causing the one or more order items to be delivered substantially on the date and time for delivery, wherein the order items may be delivered without a receiver being present.

9. The computer-readable storage medium of claim 8, having additional computer-executable instructions stored thereon that further cause the computer to:

during the period of time of pendency of the order, receive a request to pause delivery of a second list item of the recurring delivery list until a specific future date;

determine whether the order includes an order item corresponding to the second list item;

upon determining that the order includes an order item corresponding to the second list item, determine whether the specific future date is greater than the date and time for delivery of the order;

upon determining that the specific future date is greater than the date and time for delivery of the order, remove the order item corresponding to the second list item from the order; and cause the second list item to be included in a subsequently generated order having a date and time for delivery on or after the specific future date.

10. A system for providing recurring delivery of products, the system comprising:

a server computer comprising a memory and one or more processing units; and a recurring delivery module residing in the memory and configured to cause the one or more processing units to deliver a first user interface to a computing device, the first user interface configured to receive a designation of a delivery slot and a recurring delivery list comprising one or more list items identifying a product, a quantity to deliver, and a frequency of delivery, periodically generate an order comprising one or more order items selected from the recurring delivery list based on a last delivery date and the frequency of delivery of each list item, the order being generated in advance of a next occurrence of the delivery slot such that the order has a period of time of pendency prior to delivery, deliver a second user interface to the computing device, the second user interface configured to allow a user of the computing device to make changes to the recurring delivery list during the period of time of pendency of the order, receive changes made to a first list item of the recurring delivery list during the period of time of pendency of the order, upon receiving the changes, determine whether the order includes an order item corresponding to the first list item, in response to determining that the order include an order item corresponding to the first list item, modify the order item corresponding to the first list item based on the changes made to the first list item of the recurring delivery list, and provide the order to an order fulfillment system capable of causing the one or more order items to be delivered at the next occurrence of the delivery slot.

11. The system of claim 10, wherein the second user interface enables a customer to change the recurring delivery list by performing one or more of removing a list item, changing the quantity to deliver of a list item, changing the frequency of delivery of a list item, or pausing delivery of a list item until a future date.

12. The system of claim 10, wherein the delivery slot comprises a day of the week and a period of time during the day.

13. The system of claim 12, wherein the period of time during the day comprises the hours before sunrise.

14. The system of claim 10, wherein the recurring delivery list further specifies that the order may be delivered without a receiver being present and wherein the recurring delivery module is further configured to:

determine that a first list item of the one or more list items is not eligible for unattended delivery; and alert a user of the computing device that the first list item is not eligible for unattended delivery.

15. A computer-implemented method for providing recurring delivery of products, the method comprising performing instructions under the control of a computer system for:

receiving at the computer system a designation of a delivery slot and a recurring delivery list comprising one or more list items identifying a product, a quantity to deliver, and a frequency of delivery;

periodically generating, by the computer system, an order having a date and time for delivery based on a next occurrence of the delivery slot, the order being generated in advance of the date and time for delivery such that the order has a period of time of pendency prior to the delivery;

creating, by the computer system, one or more order items for the order based on a last delivery date and the frequency of delivery of each list item in the recurring delivery list;

during the period of time of pendency of the order, receiving at the computer system a request to pause delivery of a first list item of the recurring delivery list until a specific future date;

determining, by the computer system, whether the one or more order items for the order includes an order item corresponding to the first list item;

upon determining that the one or more order items for the order includes an order item corresponding to the first list item, determining, by the computer system, whether the specific future date is greater than the date and time for delivery of the order;

upon determining that the specific future date is greater than the date and time for delivery of the order, removing, by the computer system, the order item corresponding to the first list item from the order and causing the first list item to be included in a next generated order having a date and time for delivery on or after the future date; and providing, by the computer system, the order to an order fulfillment system capable of causing the one or more order items to be delivered substantially on the date and time for delivery.

16. The computer-implemented method of claim 15, further comprising:

receiving, at the computer system, changes made to a second list item of the recurring delivery list during the period of time of pendency of the order; and modifying, by the computer system, the order item of the order corresponding to the second list item based on the changes made to second list item of the recurring delivery list.

17. The computer-implemented method of claim 15, wherein one or more products in the one or more order items are provided at a discounted price if the one or more products are included in the recurring delivery list.

18. The computer-implemented method of claim 15, wherein the delivery slot comprises a day of the week and a period of time during the day.

19. The computer-implemented method of claim 15, wherein the recurring delivery list further specifies that the order may be delivered without a receiver being present and the method further comprises:

determining, by the computer system, that a first list item of the one or more list items is not eligible for unattended delivery; and alerting, by the computer system, a customer associated with the recurring delivery list that the first list item is not eligible for unattended delivery.

20. A method performed in a computer system for providing recurring delivery of products, the method comprising:

providing, by the computer system, a user interface configured to allow a selection of a delivery slot comprising a day of the week and a period of time during the day;

providing, by the computer system, a user interface configured to allow a selection of one or more products for recurring delivery and a quantity and frequency of delivery for each product;

upon selection of a delivery slot and one or more products for recurring delivery, periodically generating, by the computer system, an order in an order fulfillment system for delivery on a next occurrence of the delivery slot, the order comprising one or more items based on the quantity and frequency of delivery and a last delivered date for each of the one or more products selected for recurring delivery, the order being generated in advance of the next occurrence of the delivery slot such that the order has a period of time of pendency prior to the delivery;

providing, by the computer system, a user interface configured to allow a change to the quantity or frequency of delivery of the one or more products selected for recurring delivery;

detecting, by the computer system, a change made to the quantity or frequency of delivery of a first product of the one or more products selected for recurring delivery during the period of time of pendency of the order;

upon detecting the change made to the quantity or frequency of delivery of the first product, determining, by the computer system, whether the order includes an item corresponding to the first product; and upon determining that the order includes an item corresponding to the first product, modifying, by the computer system, the item corresponding to the first product based on the change made to the quantity or frequency of delivery of the first product.

21. The method of claim 20, further comprising:

providing, by the computer system, a user interface configured to allow a pausing of delivery until a future date of the one or more products selected for recurring delivery;

detecting, by the computer system, a pausing of delivery until a specific future date of a second product of the one or more products selected for recurring delivery during the period of time of pendency of the order;

upon detecting the pausing of delivery of the second product, determining, by the computer system, whether the order includes an item corresponding to the second product;

upon determining that the order includes an item corresponding to the second product, determining, by the computer system, whether the specific future date is greater than the next occurrence of the delivery slot;

upon determining that the specific future date is greater than the next occurrence of the delivery slot, removing, by the computer system, the item corresponding to the second product from the order; and causing, by the computer system, the item to be included in a next generated order for delivery on or after the future date.

\* \* \* \* \*

UNITED STATES PATENT AND TRADEMARK OFFICE
CERTIFICATE OF CORRECTION

PATENT NO. : 8,370,271 B1  Page 1 of 1
APPLICATION NO. : 12/610802
DATED : February 5, 2013
INVENTOR(S) : Heidi S. Robinson et al.

It is certified that error appears in the above-identified patent and that said Letters Patent is hereby corrected as shown below:

In the Claims, at Claim 3, Column 21, Line 27, should read:

ing to the ~~first~~ second list item from the order; and

Signed and Sealed this
Twenty-second Day of October, 2013

Teresa Stanek Rea
*Deputy Director of the United States Patent and Trademark Office*